US005483405A

United States Patent [19]

Kaelin

[11] Patent Number: 5,483,405

[45] Date of Patent: Jan. 9, 1996

[54] MINI-TRANSFORMER WITH MOLDED COVER AND RETENTION STRUCTURE

[76] Inventor: Ruedi Kaelin, Breitenweg 22A, CH-5703 Seon, Switzerland

[21] Appl. No.: 310,034

[22] Filed: Sep. 21, 1994

Related U.S. Application Data

[63] Continuation of Ser. No. 787,006, Nov. 4, 1991, abandoned.

[30] Foreign Application Priority Data

| | | | |
|---|---|---|---|
| Nov. 7, 1990 | [CH] | Switzerland | 3536/90 |
| Sep. 26, 1991 | [CH] | Switzerland | 2853/91 |

[51] Int. Cl.$^6$ .......... H02H 7/04; H01F 27/02; H01F 27/26

[52] U.S. Cl. .......... 361/38; 336/96; 336/98; 336/205; 336/210

[58] Field of Search .......... 336/205, 96, 192, 336/212, 210, 98; 361/35, 38, 39, 41

[56] References Cited

U.S. PATENT DOCUMENTS

| | | | |
|---|---|---|---|
| 3,445,797 | 5/1969 | Otto | 336/192 |
| 3,516,040 | 6/1970 | Ripley et al. | 336/96 |
| 3,665,358 | 5/1972 | Leuck et al. | 336/96 |
| 3,813,763 | 6/1974 | Church et al. | 29/596 |
| 3,821,678 | 6/1974 | Eley | 336/192 |
| 4,099,510 | 7/1978 | Pierrier et al. | 336/212 |
| 4,107,636 | 8/1978 | DiGirolamo et al. | 336/92 |
| 4,156,222 | 5/1979 | Rossman et al. | 336/96 |
| 4,199,743 | 4/1980 | Martincic | 336/96 |
| 4,736,179 | 4/1988 | Behnke et al. | 336/210 |
| 4,763,094 | 8/1988 | Kojima | 336/96 |
| 4,939,494 | 7/1990 | Masuda et al. | 336/192 |
| 5,028,904 | 7/1991 | Kurano | 336/96 |
| 5,088,186 | 2/1992 | Boesel | 336/96 |

FOREIGN PATENT DOCUMENTS

| | | |
|---|---|---|
| 565112 | 8/1958 | Belgium . |
| 1140988 | 12/1962 | Germany . |
| 2441864 | 4/1975 | Germany . |
| 845780 | 8/1960 | United Kingdom . |
| WO/9114274 | 9/1991 | WIPO . |

*Primary Examiner*—Thomas J. Kozma
*Attorney, Agent, or Firm*—Frishauf, Holtz, Goodman, Langer & Chick

[57] ABSTRACT

A mini-transformer features an iron or ferrite core (2) and primary and secondary windings (3, 4). Portions of the windings (3, 4) which extend beyond the iron or ferrite core (2) are covered on both sides with a thermoplastic material forming a lid (6, 7). The two lids or end bells (6, 7) are combined into one piece by means of first bars (12), which extend through the hollow spaces (9) between the windings (3, 4) and the iron or ferrite core (2) and fill them, and that the laminated iron or ferrite core (2) is fixed in itself by second bars (14) connecting the two lids (6, 7).

11 Claims, 5 Drawing Sheets

MINI-TRANSFORMER WITH MOLDED COVER AND RETENTION STRUCTURE

This application is a Continuation, Ser. No. 07/787,006, now abandoned filed Nov. 4, 1991.

FIELD OF THE INVENTION

The invention relates to mini-transformers, or small transformers; having an iron or ferrite core, and primary and secondary windings, and to a method of its production, for example of power ratings of between about 0.2 to 400 VA.

The term "mini-tansformer" or "small transformer" is intended to distinguish the field of application the present invention from large transformers, for example utility distribution transformers, high-voltage step-down transformers, and the like.

BACKGROUND

It is already known to produce mini-transformers which are wholly potted, where the entire iron core including coils is surrounded on the outside by a plastic housing. A hardenable plastic is filled in from an open housing side, so that the transformer is completely surrounded by plastic up to the rim of the housing. However, the fact that a relatively large amount of plastic is needed is a disadvantage, as is the cumbersome and slow production method, because two-component plastics, which are suited for this purpose, harden only slowly over a period of hours. A further disadvantage lies in the poor way heat is conducted away, because the plastic layer surrounds the iron core on all sides.

THE INVENTION

It is an object to provide a mini transformer and a method of its production which, in contrast to conventional embodiments, can be very efficiently produced with little effort, is suitable for mass production in large numbers and where, in spite of the crowded construction, safe electrical distances can be maintained without additional expenditure.

In accordance with the invention, the portions of the windings which extend beyond the iron or ferrite core are covered, in one plastic injection step, on both sides with a thermoplastic material forming a lid or cover on either side; the two lids are combined into one unitary plastic molding or piece by means of inner, or first bars, or connecting posts, which extend through the hollow spaces between the windings and the iron or ferrite core to fill the spaces and outer,and second bars, posts or strips which secure the laminated iron or ferrite core together, and further connect the two lids or covers. The lids or covers form end bells for the coils.

The transformer, and the method of its manufacture, has the advantage that the windings are fixed in relation to the iron or ferrite core, and are secure against displacement; and, further, the laminated iron or ferrite core elements are held compactly together, so that the otherwise customary riveting or welding of the core stack can be omitted. Heat dissipation from the core is preserved.

Application of plastic by injection to form the two lids and the first and second bars connecting the lids takes place in a single operation with comparatively little expenditure of plastic. A vibration-free mroduct is thus created in which safe electrical distances can be reliably maintained.

DRAWINGS

The drawings illustrate exemplary embodiments of the subject of the invention, which will be described in detail below.

FIG. 1 shows the production steps of the mini-transformer in which illustration 1.1 is an exploded view of the core; illustration 1.2 is a schematic perspective view of the coil body with a winding thereon; illustration 1.3 is a perspective view of the coil body assembly in the core; and illustration 1.4 is a view of the coil body, core, and injection molded lids placed on the assembly shown in illustration 1.3;

DETAILED DESCRIPTION

The mini-transformer is intended to have an output of approximately 0.2 to 400 VA. It contains a laminated iron core 2 in the form of a core stack formed of layers of individual pieces of sheet metal. The iron core 2 contains stacked laminations 2' in the shape of a letter E, which are supplemented by stacked laminations 2" to form the shape of a letter I. In the assembled state the laminated bundles in E and I- shape abut directly on each other. The core 2 has flat broad end faces 52 and four side faces 54.

A variant embodiment, particularly when ferrite cores are used, consists in that both laminated bundles have E- shapes which touch each other and are respectively mirror-reversed.

Figure 1:
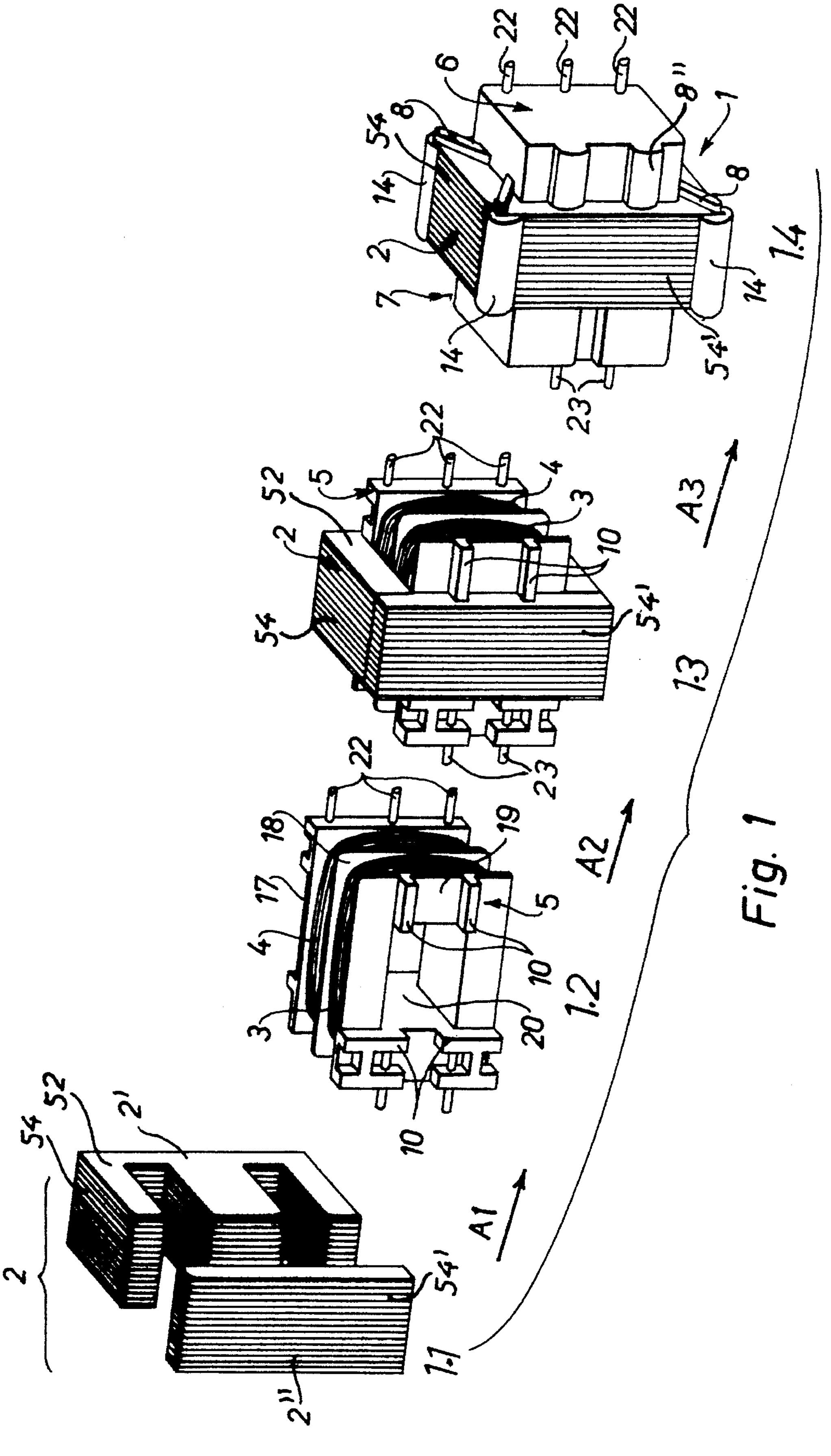
Figure 2:
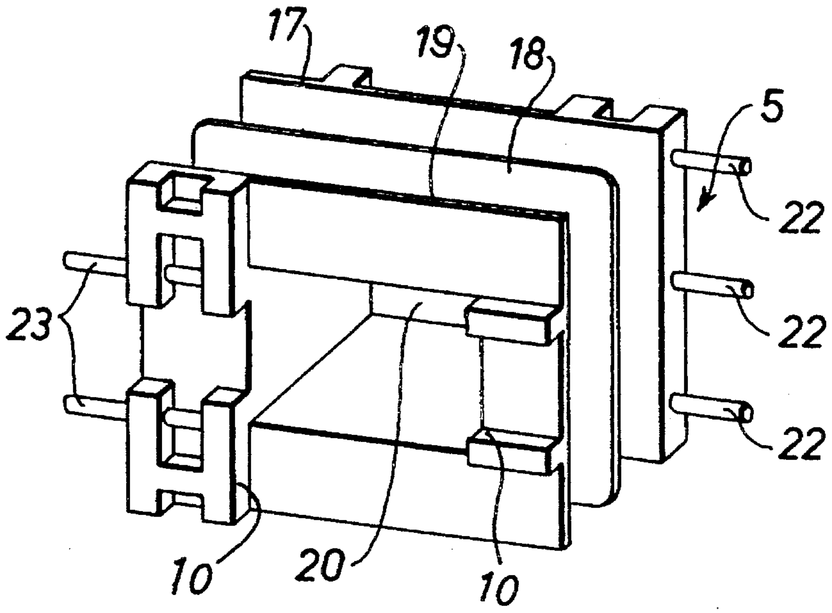
FIG. 2 shows a coil body in a perspective view.

The center leg of the E-stack 2' is inserted into the hollow space 20 of a coil body 5 and the I-stack 2" is subsequently added on the outside, as shown in FIG. 1. The two core stacks 2', 2" are supported by support ribs 10 of the coil body 5. A primary winding 3 and a secondary winding 4 are applied to the coil body 5 prior to the insertion of the iron core 2. These windings 3, 4 are maintained in the coil body 5 by support walls 17 and 19 (FIG. 2) and are separated from each other by a separating wall 18. The arrows A1, A2, A3 (FIG. 1) illustrate sequential steps in the assembly and manufacturing process.

The two windings 3, 4 and the coil body 5 extend on both sides beyond the iron core 2.

Figure 3:
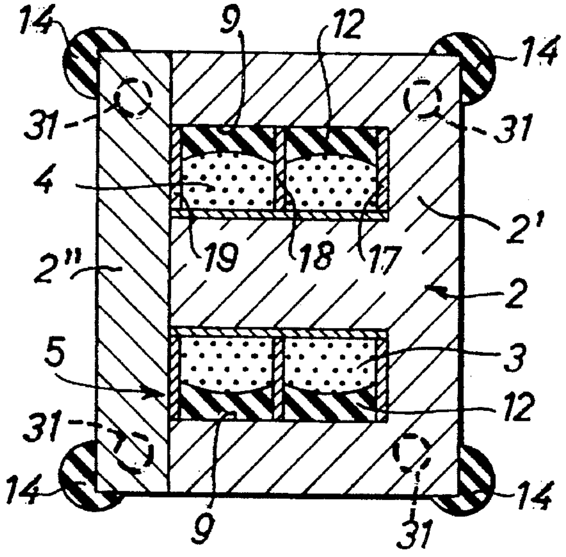
FIG. 3 shows a section through the mini-transformer of FIG. 1.

In accordance with a feature of the invention, a lid 6, 7 of a thermoplastic material, preferably polyamide, is applied by injection-molding over each one of the two winding portions which extend beyond the iron core 2. So that air can escape easily, the liquid plastic is injected only from one side, preferably from the center of one lid. The injected plastic penetrates the hollow chambers 9 between the windings 3, 4 and the iron or ferrite core 2 and forms first bars or posts, strips or connectors 12, as can be seen in FIG. 3. Because of this,the windings 3, 4 are secured vibration-free inside the coil body 5, on the one hand, and on the other in the iron or ferrite core 2.

So that the iron or ferrite core 2 is also securely kept together and that welding seams or rivets, which would disturb the magnetic flux, are avoided, outer second bars 14, curved in cross section (see FIG. 3),are disposed on the exterior of the iron or ferrite core at the corners. These are connected with each of the two lids 6, 7 via ribs, posts or strips or connectors 8 to form one piece therewith. In this way, the two lids 6, 7, together with the first and second bars 12, 14, form a single, integral piece of plastic. The sides of the lids are reinforced with ribs 8" to ensure that the laminations of the core are tightly secured together. Ribs 8" are preferably placed over the support ribs 10 of the core body 5.

If the core elements 2' and 2" are formed with holes 31 which, in prior art cores, have rivets or screws therein, the holes 31 can be filled also with plastic to form ribs or connectors similar to, but instead of, the outer ribs or strips or connectors 14. These respective posts, strips or connectors penetrate bores 31 on each corner of the iron or ferrite core 2.

Figure 4:
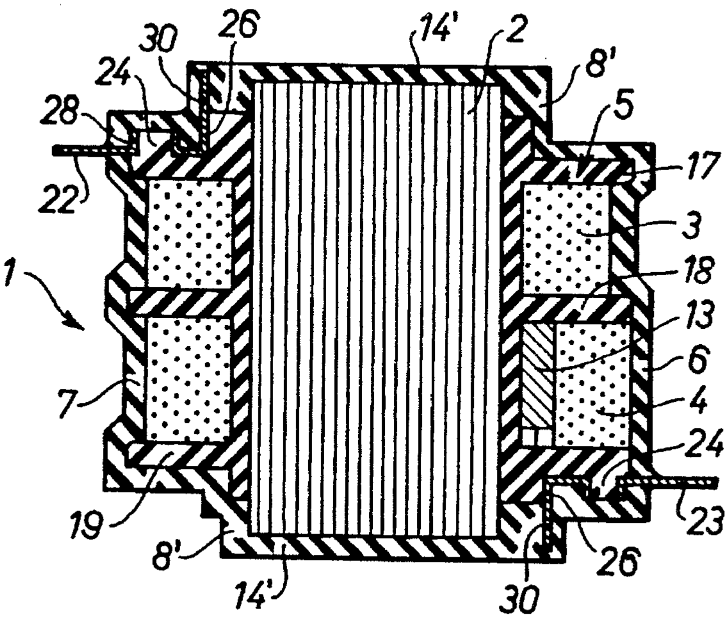
FIG. 4 shows a section along the line IV—IV of FIG. 5.
Figure 5:
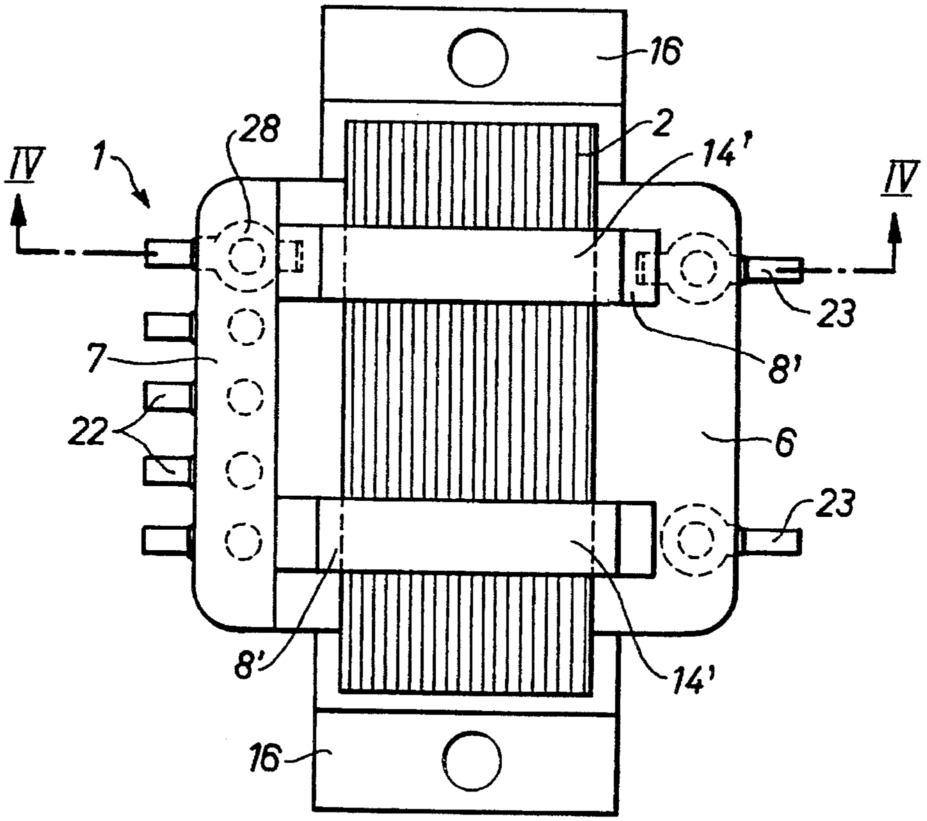
FIG. 5 shows a top view of a variant embodiment of a mini-transformer with a base.

The embodiment, in accordance with FIGS. 4 and 5, consists in that the second bars or connectors have the shape of flat straps 14' extending on the exterior over the iron or ferrite core 2, which are connected via connecting elements 8' with each one of the lids or covers 6, 7.

A thermal protection element 13 (FIG. 4) is installed in the coil body 5 as protection against excessive heat and may be either a switch, a fuse or a temperature sensor. The associated electrical contact pins or tongues 23 are cast into the lid 6 and project outwardly.

Figure 6:
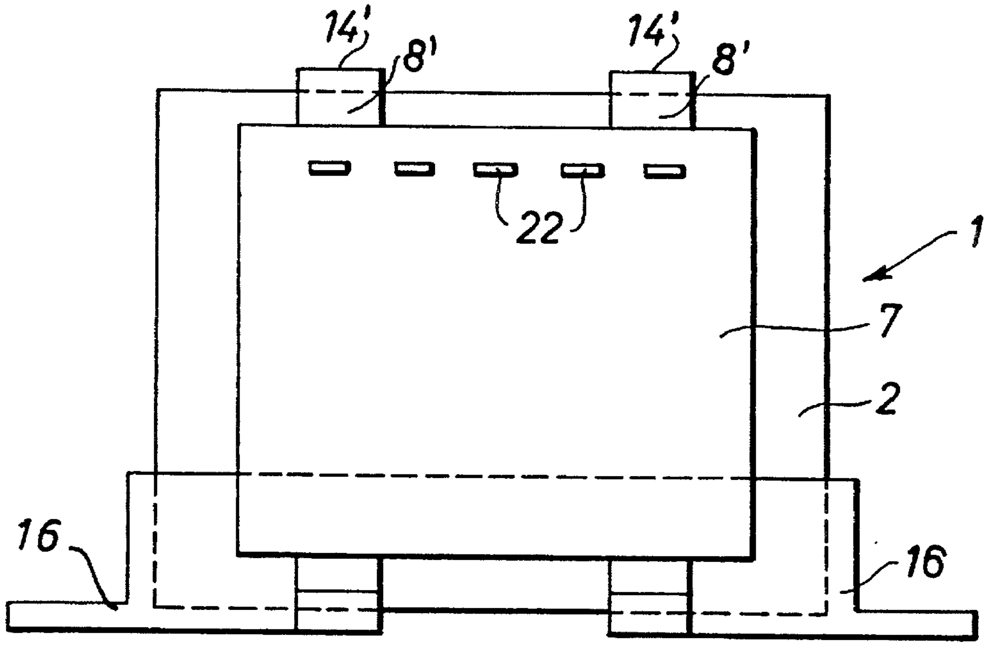
FIG. 6 shows a lateral view of the mini-transformer in accordance with FIGS. 4 and 5.

With the embodiment in accordance with FIGS. 4 to 6, a base 16 is provided, which is injection-molded as one piece on one of the lids or covers.

The electrical connecting wires of the coils 3, 4 are each connected to metallic connecting pins 22, 23 or flat tongues, which extend out of the lids 6, 7. For fastening these pins, lugs or tongues 22, 23, the coil body 5 contains an integrated fastening peg 24 and a stop edge 26. Each of the fastening pins or tongues 22, 23 has a lug portion 28, which is placed over the fastening peg 24, and a cropped tab 30 which abuts against the stop edge 26 and, in this way, prevents rotation.

The soldering joints for the connecting wires are embedded in the lids 6, 7 and are covered with plastic. The connecting wires for the thermal protection element 13 are connected to separate pins or tongues.

Figure 8:
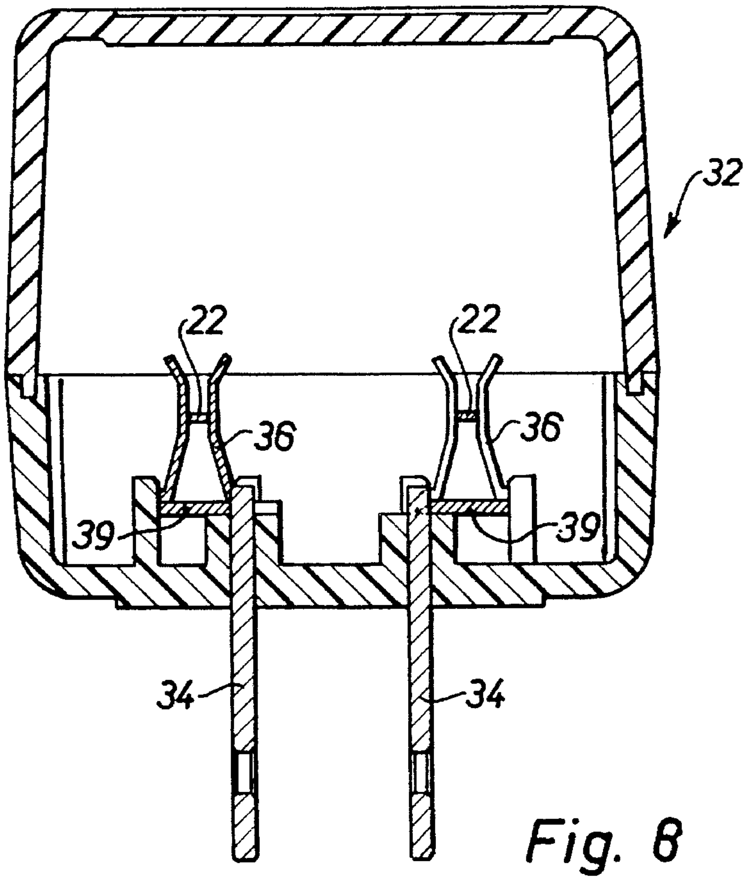
FIG. 8 shows a section along the line VIII— VIII of FIG. 7.
Figure 7:
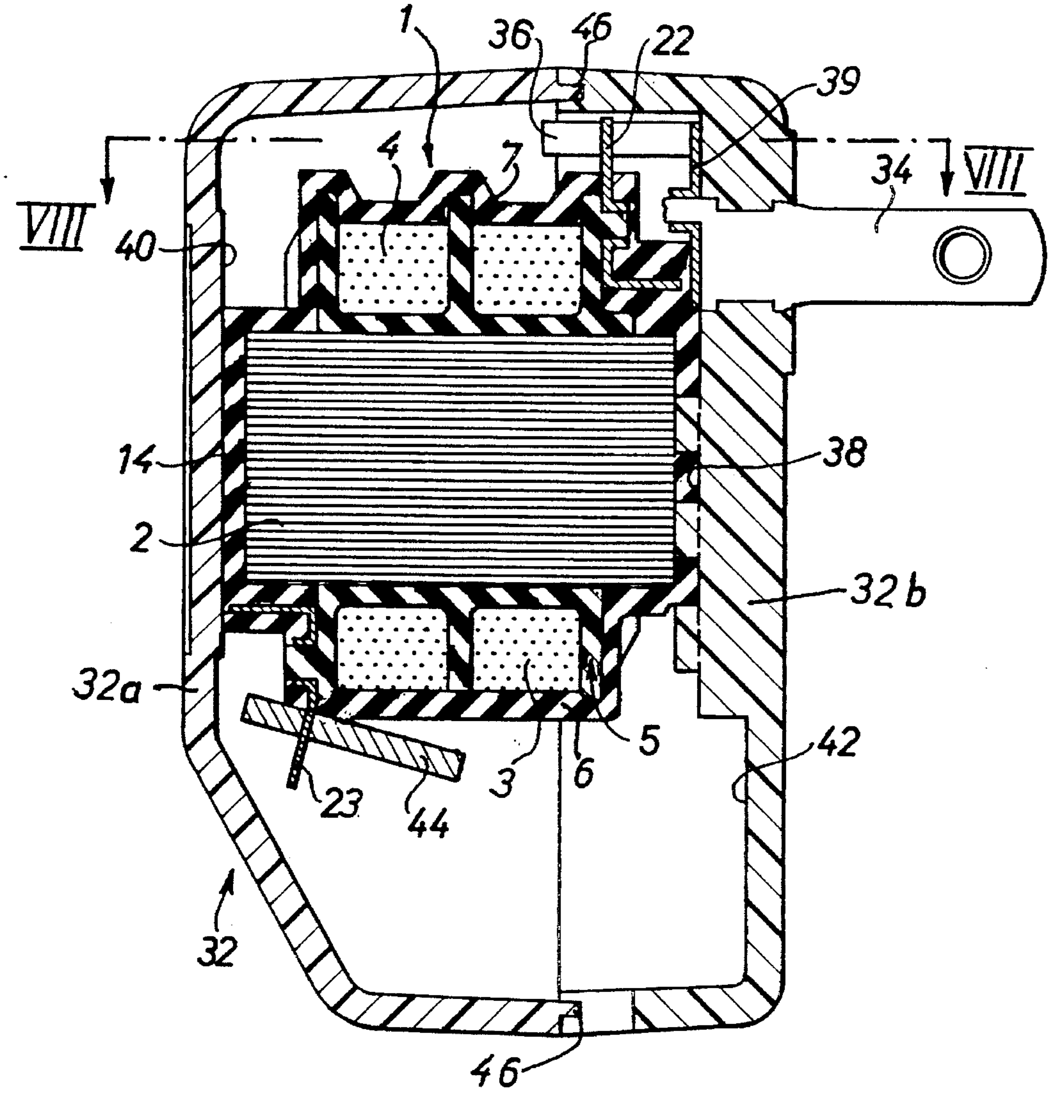
FIG. 7 shows a section through a mini-transformer built into a housing.

FIGS. 7 and 8 show a mini-tranformer 1 of the type described, which is enclosed in a two-piece housing 32. The electrical connection with the conventional power supply is provided via a two-pole plug 34 which is rigidly connected with the housing 32. An electrical connection leads from there via electrical conductors 38 to two resilient metal clips 36, which provide an electrically conductive connection with the pins or tongues 22 extending from the mini-transformer 1. Fastening of the mini-transformer 1 in the housing 32 is made without screws by means of interconnecting pins and grooves 38 in one of the housing parts, namely the backside 42 of the housing (FIG. 7). On the opposite side of the housing, the mini-transformer 1 lies flush against the inner wall 40 of the other housing part. Ribs are provided in the housing interior for the lateral fixation of the mini-transformer 1, which laterally fix the iron core 2. An obliquely disposed plate 44 is provided as a conductor board to receive electrical components or the like. A cable, not shown, is connected to the pins or tongues 23 for take-off of the current with a voltage which normally is transformed down to low voltage.

The two halves of the housing 32*a*, 32*b* are kept together by means of interconnecting snap tongues 46, by screws or the like, or they are welded together.

The characteristics described make possible a particularly efficient production with small requirements for raw materials and semi-finished products. Furthermore, testing expenses and the amount of rejects can be reduced.

Various changes and modifications are possible within the scope of the inventive concept, and features of one embodiment may be combined with features of another embodiment.

I claim:

1. A small or a mini-transformer (1)

a unitary coil body (5) having a central aperture with two lateral support walls (17, 19) and external core support ribs (10);

primary and secondary windings (3,4) located on said unitary coil body (5), electrically and physically separated from each other; and a core (2) of ferromagnetic material, including a core element (2') which is generally E-shaped and having a central leg, and a further core element (2") positioned to complete the magnetic circuit of the core (2), said coil body being placed on the core with the central leg of the E-shaped core element (2') extending through the central aperture (20) of the coil body, said coil body, with the windings thereon, leaving hollow spaces (9) between the core (2) and the coil body (5), wherein the core (2) defines two broad end faces (52) and four side faces (54, 54') said short side faces defining two parallel longer sides (54')and two parallel shorter sides (54), at right angles to the-longer sides; and a single unitary integral injection-molded cover and retention structure of thermoplastic material said cover and retention structure comprising two lids or covers (6,7) extending at least in part over both broad end faces (52) of the core and over the coil body and thereby form lids or covers (6,7) over the coil body and the windings located thereon lateral connector portions (8,8') extending from said covers over at least part of said broad end faces (52) of said core (2) and overlapping the end edges of the end faces.

injected first bars (12) or connectors located within the hollow spaces (9) between the windings (3,4) and the core (2), completely filling said hollow spaces, securing the windings (3,4) in place, and insulating them against each other and against the core, and second bars or connectors (14, 14') in strip or bar form positioned outside of the core and arranged between and connecting said connector portions (8, 8') and hence said lids or covers (6,7), overlapping at least two of the sides of the core and clamping around the outside of the core while leaving the sides (54, 54') of the core between the second bars or connectors essentially devoid of plastic materials, said first bars or connectors, said second bars or connectors (14, 14'), and said connector portions (8,8'), and said lids or covers (6,7) together of the unitary injection molded cover and retention structure, clamping the core (2) and the coil body (5) with the windings thereon.

2. The transformer of claim 1, including connecting elements (22, 23) each having a tongue, a lug portion (28) formed with a recess and an angled tab (30), said connecting elements being positioned transversely to the broad end faces (52) of the core;

said coil body (5) being formed with fastening pegs (24) engaging the recesses of the lug portions (28) and further with stop edges against which said angled tabs (30) abut to secure the lug elements against rotation and disturbance;

and wherein said lids (6,7) of said thermoplastic unitary structure covers said lug particles (28) and said angled tab (30), said tongues penetrating through and extending out side of said lids (6,7).

3. The transformer of claim 1, wherein said core support ribs (10) of the unitary coil body are in engagement with said core (5).

4. The transformer of claim 1 wherein said second bars or connectors (14) are located at the corners of the longer and shorter sides (54', 54) of the core (2).

5. The transformer of claim 1, wherein the second bars or connectors (14) pass around said core (2) on two of said side faces (54) in the form of straps.

6. The transformer of claim 1, further including a thermal protection element (13) located on the coil body (5); and electrical connection elements (23) coupled to said thermal protection element extending through one of the lids (6, 7).

7. The transformer of claim 1, wherein said unitary thermoplastic injection-molded structure comprises a base portion (16).

8. The transformer of claim 1, further including a two-part plastic housing (32) having externally projecting connecting blades (34); and internal interconnecting pin-and-groove elements (38) on at least one of said housing parts for retaining the core, and the thermoplastic lid-and-connector structure in position within said housing.

9. The transformer of claim 8, wherein said interengaging pins and grooves (38) are located between said second bars or connectors (14) at one inner side (42) of the housing and wherein the opposite inner housing side (40) is fitted against said core (2).

10. The transformer of claim 2, wherein said unitary thermoplastic injection-molded structure comprises a base portion (16);

a housing, including resilient clips (36) projecting interiorly of the housing;

and wherein said resilient clips are positioned for resilient engagement with said electrical connecting elements (22, 23).

11. The transformer of claim 1 wherein said broad end faces (52) are uninterrupted and continuous, whereby said core of ferromagnetic material will be devoid of holes extending through the core.

* * * * *